Dec. 15, 1931.  H. R. RAFTON  1,836,280
VALVE
Original Filed June 15, 1928  2 Sheets-Sheet 1
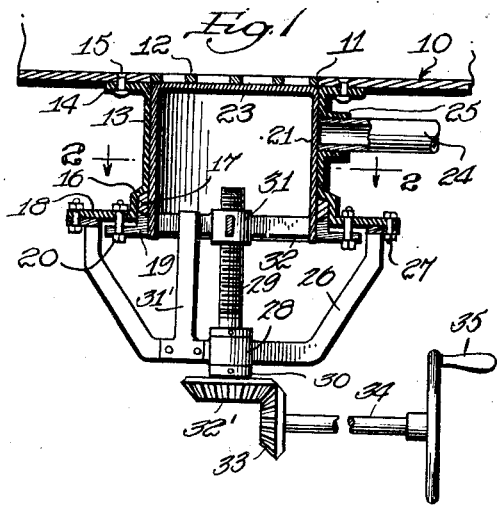
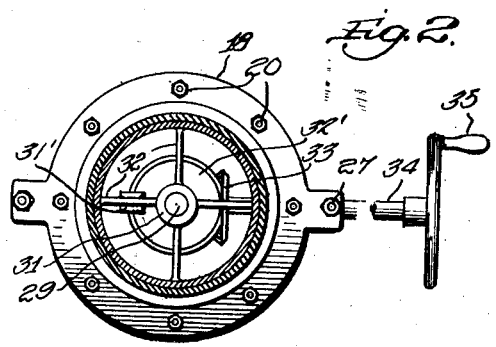
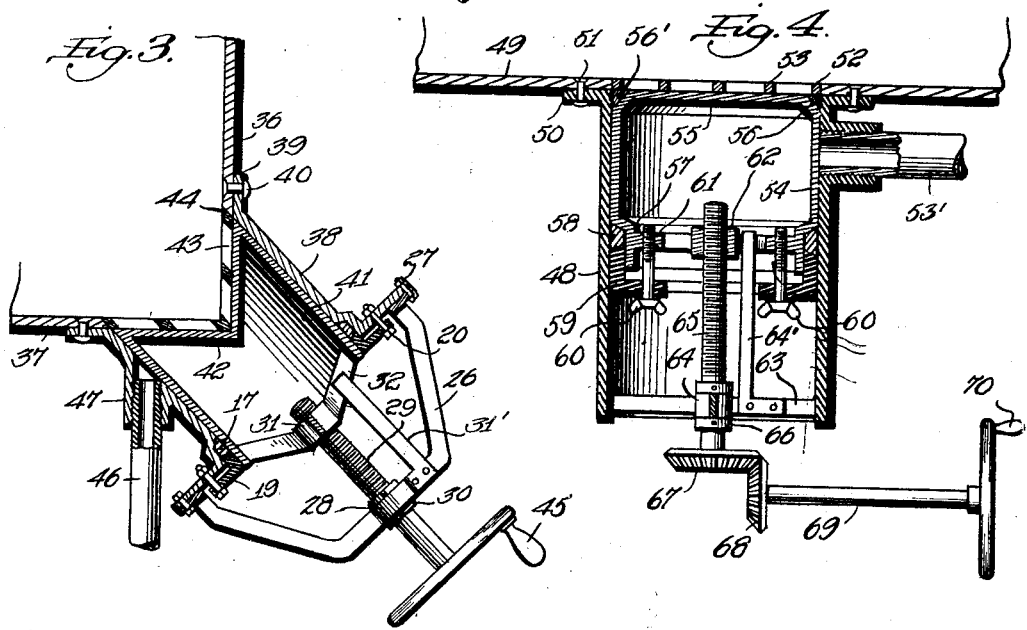
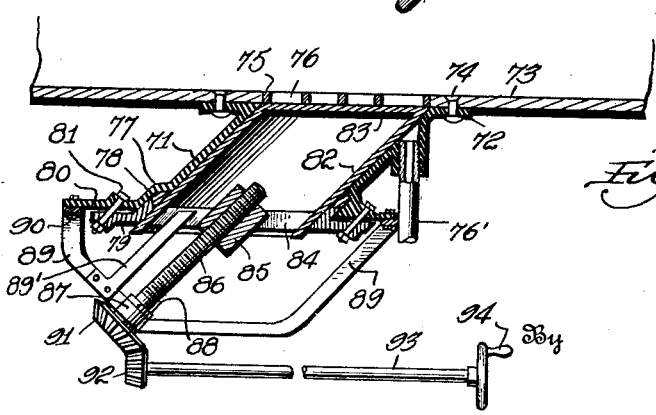
Inventor
HAROLD R. RAFTON
By C. R. Parker Jr.
Attorney Dec. 15, 1931.  H. R. RAFTON  1,836,280

VALVE

Original Filed June 15, 1928   2 Sheets-Sheet 2

Inventor
HAROLD R. RAFTON

By C. R. Parker Jr.
Attorney

Patented Dec. 15, 1931

1,836,280

UNITED STATES PATENT OFFICE

HAROLD ROBERT RAFTON, OF LAWRENCE, MASSACHUSETTS, ASSIGNOR TO RAFTON ENGINEERING CORPORATION, A CORPORATION OF MASSACHUSETTS

VALVE

Application filed June 15, 1928, Serial No. 285,626. Renewed March 2, 1931.

This invention relates to valves, and more particularly to valve structures for sludge tanks and the like.

It is necessary in a number of chemical arts to provide valves in the bottom of precipitating or reaction or sludge tanks or the like for withdrawing the precipitate or sludge therefrom, and the use of such valves often involves considerable mechanical difficulty. For example, in the manufacture of fillers and pigments, certain chemical reactions are caused to take place in large tanks to form a precipitate. In one known process of this character, dolomitic lime is slaked with water to form a slurry consisting substantially of water and the hydroxides of the metals. Water and sodium carbonate are then added and the mix heated, there being formed by the reaction a precipitate of considerable mass.

In using valve structures of the ordinary type such as gate valves and plug cocks, no matter how closely these may be attached to the bottom of the tank, their construction is such that a substantial space exists between the bottom of the tank and the operating surface of the valve. This in effect becomes a pocket in which material lodges and hardens and thereby seals the discharge opening of the tank so that after the valve is opened it is sometimes found difficult if not impossible to drain the tank. This is especially troublesome in the above cited instance, when, for example, small pieces of lime enter the pocket, and upon slaking expand, thereby effectively filling this pocket with a deposit which is difficult to dislodge when it is desired to drain the tank.

In another type of valve structure the valve operates to make a closure at or near the bottom surface of the tank, but in such cases the operating mechanism of the valve, such, for example, as the valve stem, is exposed to the tank contents when the tank is drained. Difficulty has been experienced in maintaining such valves in proper operating condition due to the collecting and hardening of the precipitated material, sludge, or grit segregated therefrom, around the operating parts of the valve and/or in pockets in the body of the valve structure beyond the valve itself. Moreover, the exposure of some of the operating parts to the tank contents, in many cases, causes considerable erosion or corrosion.

In still another type of valve structure, the valve is operated by raising or lifting it into the tank itself away from the bottom of the tank, which involves difficulties when the tanks are equipped with agitators. Even the best examples of this type of valve structure may prevent the close contact of the agitating device with the bottom of the tank, which is so essential to complete mixing in certain cases where thick slurries are being treated.

An important object of the present invention is to provide a novel valve structure which is particularly adapted for use in connection with sludge tanks of the character referred to, the valve being operative under all conditions.

A further object is to provide a valve of such character that movement of the valve is adapted to cut the associated parts of the valve structure free from the collected precipitated material, thus permitting the valve to operate regardless of the hardening of the material.

A further object is to provide a valve structure of the character referred to and operating means therefor, the operating means and parts of the valve structure beyond the valve being protected from the material flowing through the valve structure, thus preventing them from becoming clogged by the hardened precipitated material.

A further object is to provide a sludge tank valve which is adapted to be maintained leakproof under all operating conditions.

A further object is to provide a valve which may be adapted for use in the bottom, lower sides or corners of a sludge tank or the like depending upon the desired direction of discharge of the material, or other controlling factors.

A further object is to provide a valve having one portion adapted to form in effect a portion of a wall of a tank, when in closed position, and adapted to be opened to permit material to be drawn from the tank.

A further object is to provide a valve which will not interfere with mechanical agitators in the tank in which it is installed.

Other objects and advantages of the invention will become apparent during the course of the following description.

In the drawings I have shown several embodiments of the invention. In this showing, Figure 1 is a central vertical sectional view of one form of valve shown attached to the bottom of a tank, Figure 2 is a section on line 2—2 of Figure 1, Figure 3 is a central vertical sectional view similar to Figure 1 showing a modified form of the invention, Figure 4 is a similar view of an additional modification, Figure 5 is a similar view of a further modified form of valve and associated elements.

Figure 6:
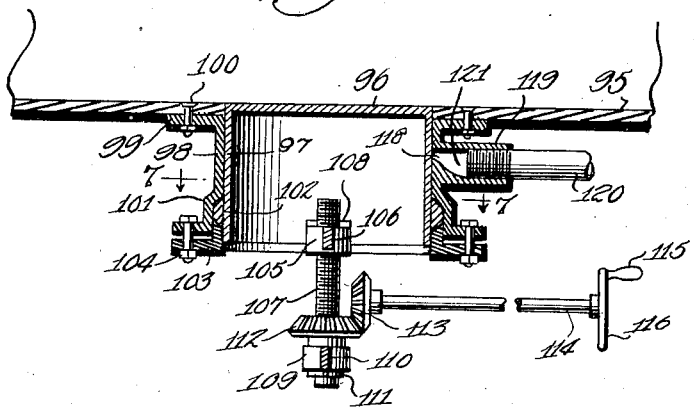
Figure 6 is a similar view of a further modification.

Referring to Figures 1 and 2, the numeral 10 designates the bottom of a sludge or other tank having a discharge opening 11 therein, covered by a grating or the like 12. A cylinder or sleeve 13 is mounted beneath the tank and is provided at its upper end with a flange 14 riveted as at 15 or otherwise secured to the bottom of the tank. The sleeve is offset adjacent its lower end as at 16 to receive packing 17, for a purpose to be described, and an outstanding flange 18 is formed preferably at the lower extremity of the sleeve. A gland 19 engages the packing 17, and the latter is adapted to be compressed by tightening bolts 20 passing through the gland 19 and flange 18.

A cylindrical valve 21 fits snugly and is adapted to reciprocate in the sleeve 13 and is provided with a preferably integral closed head 23 which corresponds in shape to the wall of the container adjacent said opening and forms, in effect, a portion of the bottom of the tank when the valve is in the closed position shown in Figure 1. The valve is movable downwardly in a manner to be described to discharge material from the tank through a suitable discharge pipe 24 which may be threaded in a boss 25 carried by the sleeve 13.

A yoke 26 is bolted as at 27, or otherwise secured to the flange 18, and a bearing 28 is carried by the yoke centrally thereof and in axial alinement with the valve and its sleeve. A threaded shaft 29 is mounted in the bearing 28 and fixed collars 30 are carried by the shaft and contact with opposite faces of the bearing to prevent longitudinal movement of the shaft with respect thereto. The shaft 29 is threaded in a collar 31 carried by spider arms 32, preferably formed integral with the valve 21. Guides 31' are carried by the yoke 26 and engage one of the spider arms 32 to prevent rotation of the valve 21.

Any suitable means for operating the shaft 29 may be provided. In the present instance, the shaft is illustrated as being provided with a bevel gear 32' meshing with a similar gear 33 carried by a shaft 34. This shaft may be journalled in suitable bearings (not shown) and may be rotated by a handle 35 or other operating means.

The form of the device shown in Figure 3 is adapted for use at a corner portion of a tank. In this form of the invention the valve is associated with the side and bottom walls 36 and 37 of the tank respectively, at the junction of these walls forming the bottom corner of the tank. A sleeve or cylinder 38 is flanged as at 39 whereby it may be riveted as at 40 or otherwise secured to the corner portion of the tank, and it will be apparent that the upper end of the sleeve is shaped to fit the adjacent portion of the tank. A similarly shaped valve 41 is mounted to reciprocate in the sleeve, the upper end 42 of the valve corresponding to the shape of the corner portion of the tank. A grating 43 is preferably arranged in the opening 44 in the tank, through which the material is adapted to be discharged.

The packing for the valve, and the operating means therefor are substantially the same as in the form previously described, and need not be referred to in detail. In the modified form, a handle 45 may be directly connected to the shaft 29 if desired. Material from the tank may be discharged therefrom, when the valve is open, through a preferably vertical pipe 46 threaded in a boss 47 carried by the sleeve 38.

A further modification of the invention is shown in Figure 4 wherein a somewhat elongated vertical sleeve 48 is arranged against the bottom of the tank 49 and is flanged as at 50 to permit it to be secured in position by rivets or the like 51. An opening 52 in the bottom of the tank permits the discharge of material therefrom and may be covered with a grating 53. Material is drawn from the sleeve 48 through a suitable take-off pipe 53'.

A cylindrical valve 54 is reciprocable in the sleeve and is closed by an upper head 55, the outer edge portions of which may be beveled as at 56 to contact with a beveled seat 56' threaded in the sleeve 48 flush with the upper end thereof. The lower end of the valve is offset inwardly as at 57 to provide a space for the reception of packing 58 engaged by a suitable gland 59 which may be tightened by thumb screws 60 or similar elements. These thumb screws are threaded in spider arms 61 preferably formed integral with the valve and terminating in a central internally threaded collar 62.

The sleeve 48 is preferably cylindrical throughout its length and extends a substantial distance below the valve. A spider 63 is carried by the lower end of the sleeve and is provided with a central boss 64 in which a threaded shaft 65 is rotatably mounted. Fixed collars 66 are carried by the shaft and engage the bearing or collar 64 to prevent longitudinal movement of the shaft. Turning movement of the valve 54 may be prevented by guides 64' carried by and extending upwardly from the spider 63 and slidably engaging one of the spider arms 61. The upper end of the shaft is threaded in the collar 62 and a bevel gear 67 is carried by the lower end of the shaft. This gear meshes with a similar gear 68 carried by a shaft 69 rotatably supported in any suitable manner, and provided with an operating handle 70.

The further modification shown in Figure 5 may be employed when it is desired to withdraw the material from the tank through a vertical take-off pipe. In this form of the invention, an inclined sleeve 71 is flanged at its upper end as at 72 for connection with a tank 73 by means of rivets 74 or similar fastening elements. The outlet opening 75 of the tank, as in the other forms of the invention described, may be covered by a suitable grating 76. The sleeve 71 is provided with a preferably vertical take-off pipe 76'. The lower portion of the sleeve is offset outwardly as at 77 to provide a space for the reception of packing 78 engaged by a gland 79. A flange 80 extends outwardly from the lower extremity of the sleeve, and bolts 81 extend through this flange and through the gland 79, whereby the latter may be drawn upwardly to compress the packing. It will be apparent that the bolts 81 are arranged parallel to the axis of the sleeve 71.

A valve 82 is mounted to reciprocate in the sleeve 71 and is closed by an upper head 83 adapted to be moved to closed position against the bottom of the grating 76. A spider 84 is carried by the lower end of the valve 82, and is provided with an internally threaded central boss 85 receiving a threaded shaft 86. This shaft is rotatable in a bearing 87 and is held against longitudinal movement with respect thereto by fixed collars 88. The bearing 87 preferably is formed integral with arms 89 bolted or otherwise secured as at 90 to the flange 80, and guides 89' are carried by the arms 89. These guides slidably engage one of the arms of the spider 84 to prevent rotation of the valve 82.

The shaft 86 is shown in the present instance as being provided with a bevel gear 91 meshing with a similar gear 92 carried by a shaft 93. Suitable bearings (not shown) may be provided for the shaft 93, and the latter may be rotated by a handle 94. Any suitable operating means may be substituted for that described, and if desired the shaft 93 may be reversed to permit the valve to be operated from the opposite side of the tank.

In the form of the invention shown in Figure 6, the grating is eliminated from the bottom 95 of the tank so that the head 96 of the cylindrical valve 97 is flush with the inner face of the bottom of the tank. The valve is reciprocable in a cylindrical sleeve 98, flanged as at 99 to permit it to be secured to the bottom of the tank by rivets 100 or other fastening elements. The lower end of the sleeve 98 is enlarged as at 101 to receive packing 102. A gland 103 is adapted to be drawn up by bolts 104 to compress the packing, as will be obvious.

This form of valve may be employed in certain cases where it is desirable to so construct the valve structure that it will occupy a minimum height, thus enabling tanks to which it is attached to be placed nearer the floor. In this construction, the valve is provided with a central collar 105 preferably connected to the valve 97 by diametrically opposite spider arms 106. A shaft 107 is threaded in the collar 105 and is provided above the latter with a stop pin 108. This pin is adapted to limit upward movement of the valve when the grating is eliminated and the seat illustrated at the upper end of the sleeve in Figure 4 is not used. Thus, in its closed position, the valve will be arranged with its head flush with the bottom of the tank to form a continuation thereof.

The lower end of the shaft 107 is journalled in a bearing 109 suitably connected to the lower flange of sleeve 98 by arms 110. Vertical movement of the shaft with respect to the bearing 109 is prevented by collars 111. A bevel gear 112 is carried by the shaft and meshes with a similar gear 113 mounted upon a shaft 114. Rotation of the latter shaft is accomplished by operation of a handle 115 connected to a hand wheel 116. It will be apparent that the upper portion of the gear 113 is adapted to enter the lower end of the valve 97 without interference with the spider arms 106, rotation of the valve during operation being prevented by guides 117, similar to the guides previously described, and carried by the arms 110.

For the purpose of minimizing the downward movement of the valve necessary to discharge material from the tank, the sleeve 98 is provided with a preferably elliptical discharge opening 118. This opening extends into a boss 119 in which a discharge pipe 120 is threaded, the outer end of the discharge opening 118 merging into a circular shape to correspond to the shape of the pipe 120, as indicated at 121. The area of the opening 118 is preferably equal to the area of the passage in the pipe 120, and by restricting the vertical height of the opening 118, the latter may be fully opened to discharge material with a minimum valve movement.

The operation of the form of the invention shown in Figures 1 and 2 is as follows:

The head 23 of the valve forms in effect a portion of the bottom of the tank when the valve is in the closed position shown in Figure 1. Thus the material will be held in the tank, and any desired chemical reactions may be carried out. When it is desired to drain material from the tank, the handle 35 is operated to transmit rotating movement to the shaft 29. Since vertical movement of the shaft 29 is prevented by the collars 30, it will be apparent that the threads of the shaft will engage the collar 31 to effect downward movement of the valve. As soon as the head 23 of the valve clears the opening in the pipe 24, the material will be drained outwardly therethrough.

Reverse rotation of the handle 35 obviously will close the valve, and the material will be scraped from the sides of the sleeve 13, as the valve moves upwardly, and thus movement of the valve will not be impeded. Leakage of liquid past the valve into the mechanism readily may be prevented by properly tightening the gland 19 to compress the packing 17. The valve forms an effective protecting medium for its operating mechanism, and thus the latter is prevented from coming into contact with any of the material from the tank. Thus the operating mechanism will be maintained clean and in proper operating condition at all times. Where a positive seal is required to prevent traces of liquid entering the outlet pipe 25 when the valve is closed, a beveled or other type of seat contacting with the closed valve may be utilized as in Figure 4.

With prior valve structures adapted for use in draining precipitates or sludges of the character referred to from sludge tanks, the material has been found to harden around the valve and the operating parts thereof to such an extent that it has often been necessary to carefully clean the parts, the cleaning operation often requiring several hours during which the use of the tank is lost. The valve of the present invention is self cleaning, does not interfere with mechanical agitation, does not pocket material above itself, and does afford protection for its operating mechanism, and accordingly it is never necessary under ordinary conditions to remove the mechanism for cleaning.

The operation of the other forms of the invention is substantially the same as in the form previously described. The outlet pipes shown in Figures 3 and 5 are vertically arranged to permit a free flow of material from the tanks when it is found to be necessary or desirable. The moving parts of the devices, however, operate in the manner previously described.

The operation of the form of valve mechanism illustrated in Figure 4 also is the same as in the forms previously described except that the packing means for the valve is carried by the valve instead of by the sleeve. Rotation of the screws 60 is adapted to compress the packing 58 to prevent the leakage of any liquid past the valve 54.

It will be noted that in the forms of the invention illustrated in Figures 1 to 5 inclusive, a grating is shown above the valve. This grating is not a necessary feature of my invention, but is a desirable one to prevent the entrance into the valve structure of any material too large to pass through the outlet opening, such as stones, stray bolts, or the like. The openings in such grating should be smaller than the diameter of the outlet pipe.

If it is desired to have the top of the valve absolutely flush with the inside of the bottom of the tank, the form of the invention shown in Figure 6 may be employed. In such case, it will be noted that the head of the valve, when in closed position will form a smooth continuation of the bottom of the tank, and movement of the valve upwardly beyond normal closed position may be prevented by any suitable means, such as the pin 108. Otherwise, the operation of this form of the valve is substantially the same as in the forms previously described.

Figure 7:
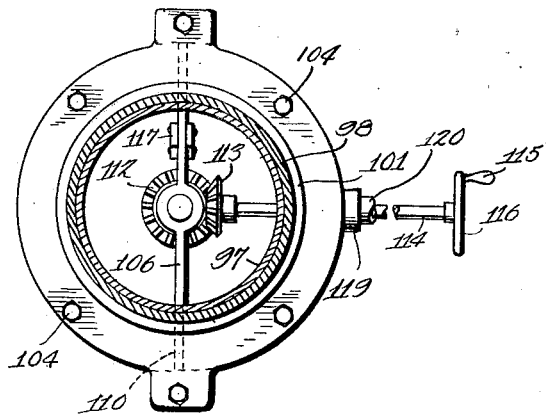
Figure 7 is a section on line 7—7 of Figure 6.
Figure 8:
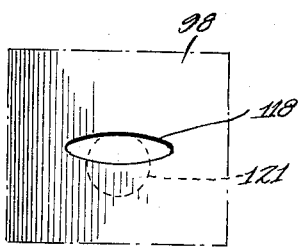
Figure 8 is a fragmentary view of the valve opening illustrated in Figure 6.

In connection with the form of the device shown in Figures 6, 7 and 8, it will be noted that the arrangement of the gears 112 and 113 above the collar 109, and the vertical flattening of the discharge opening 118 permits the valve to be opened with a minimum vertical movement, and limits the height required for the valve structure beneath the tank. Thus the bottom of the tank may be placed relatively close to the floor. The area of the discharge opening 118 is substantially the same as that of the passage through the pipe 120, and thus the discharge of material will not be restricted.

It will be noted that in each of the forms of the invention illustrated, the head of the valve forms substantially a continuation of the bottom of the tank when in closed position, while the side walls of the valve form a closure for the outlet opening. Thus, leakage from the tank is prevented when the valve is closed, and similarly, back drainage from the outlet pipe is prevented, and accordingly none of the tank contents can find their way beneath the valve to interfere with any of the operating elements.

Where, in referring to the face of the valve in closed position in relation to the container wall, I use the expression "in effect a portion", or "a substantial continuation", or "in effect a continuation", or the like, it is, of course, intended that structures such as those illustrated in Figures 1 to 5 inclusive shall be included. In these figures, although the valve itself when in closed position is not exactly flush with the inner surface of the container wall, still it is substantially flush. In other words, these surfaces are flush except for a very shallow and negligible depression or depressions such, for example, as may be caused by a superimposed grid or the like. From a practical standpoint, these depressions are unimportant since any layer of material collecting therein will be very thin, and will be immediately broken upon the opening of the valve, by the weight of the supernatant fluid, and thus no "pocket" is formed in the sense that it exists in the prior valve constructions referred to above.

Although reference has been made only to valves of cylindrical type, my invention is not limited to such a type but obviously embraces valves of any cross sectional form. It also will be apparent that any number of outlet pipes may be employed if desired.

As stated above, and as defined in a number of the claims, the valve fits the opening in the tank in such a way as to form, in effect, a portion of the wall or a continuation thereof. This statement however is not to be understood as restricting the invention to a structure wherein the valve head is of substantially the same size as the opening in the adjacent wall of the casing, but also is to be understood as covering constructions wherein some portion of the structure other than the valve per se covers a portion of the tank opening. For example, it is entirely possible to use an enlarged or irregular opening in the wall of the tank, and to extend the attaching flange of the valve to cover the portion of such opening which is not adapted to be covered with the valve. In such a case, as an example, it is to be understood that the portion of the valve casing partially closing the tank opening is to be considered as a portion of the tank wall when construing the statement that the valve forms in effect a portion of the tank wall, or a continuation thereof.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. The combination with a container having an opening in one wall thereof, of a valve movable toward and away from said opening, said valve having a portion corresponding in shape to said opening and adapted to form a closure therefor and to form in effect a continuation of said wall of the container, means snugly surrounding said valve and supporting it for reciprocation toward and away from said opening, means for actuating said valve, and an outlet conduit spaced from said wall of the container and covered by said valve when the latter is acting as a closure for said opening and adapted to communicate with the interior of said container when said valve is moved away from said opening.

2. The combination with a container having an opening therein, of a cylindrical valve having an end adapted to form a closure for said opening, a sleeve secured to the container and snugly surrounding said valve to support it for reciprocation toward and away from said opening, a conduit communicating with the interior of said sleeve at a point spaced from said opening and covered by said valve when the latter is acting as a closure for said opening, and means for actuating said valve.

3. The combination with a container having an opening therein, of a cylindrical valve having an end adapted to form a closure for said opening, a sleeve secured to the container and snugly surrounding said valve to support it for reciprocation toward and away from said opening, a conduit communicating with the interior of said sleeve at a point spaced from said opening and covered by said valve when the latter is acting as a closure for said opening, means for providing packing between said valve and said sleeve adjacent the ends thereof remote from said opening, and means for actuating said valve.

4. The combination with a container having an opening therein, of a hollow cylindrical valve having a head at one end corresponding in shape to said opening and adapted to form a closure for the latter, a sleeve secured at one end to said container and snugly surrounding said valve to support it for reciprocation toward and away from said opening, packing arranged between said sleeve and said valve adjacent the ends thereof remote from said opening, and a conduit communicating with the interior of said sleeve between said opening and said packing.

5. The combination with a container having an opening therein, of a hollow cylindrical valve having a head at one end corresponding in shape to said opening and adapted to form a closure for the latter, a sleeve secured at one end to said container and snugly surrounding said valve to support it for reciprocation toward and away from said opening, packing arranged between said sleeve and said valve adjacent the end thereof remote from said opening, a conduit communicating with the interior of said sleeve between said opening and said packing, and a shaft connected to said valve and adapted to be actuated to move the latter toward and away from said opening.

6. The combination with a container having an opening therein, of a hollow cylindrical valve having a head at one end corresponding in shape to said opening and adapted to form a closure therefor, the opposite end of said valve being open, a sleeve secured at one end to said container and snugly surrounding said valve to support it for reciprocation toward and away from said opening, a conduit communicating with the interior of said sleeve at a point spaced from said opening and covered by said valve when the latter is acting as a closure for said opening, a member arranged in the open end of said valve and secured thereto, and means associated with said member for moving said valve toward and away from said opening.

7. The combination with a container having an opening therein, of a hollow cylindrical valve having a head at one end corresponding in shape to said opening and adapted to form a closure therefor, the opposite end of said valve being open, a sleeve secured at one end to said container and snugly surrounding said valve to support it for reciprocation toward and away from said opening, a conduit communicating with the interior of said sleeve at a point spaced from said opening and covered by said valve when the latter is acting as a closure for said opening, and operating connections for moving said valve toward and away from said opening, said operating connections being connected to said valve within the open end thereof.

8. The combination with a container having an opening therein, of a hollow cylindrical valve having a head at one end corresponding in shape to said opening and adapted to form a closure therefor, the opposite end of said valve being open, a sleeve secured at one end to said container and snugly surrounding said valve to support it for reciprocation toward and away from said opening, a conduit communicating with the interior of said sleeve at a point spaced from said opening and covered by said valve when the latter is acting as a closure for said opening, a collar carried by said valve within the open end thereof, and an operating shaft mounted in said collar and adapted to be actuated to move said valve toward and away from said opening.

9. The combination with a container having an opening therein, of a hollow cylindrical valve having a head at one end corresponding in shape to said opening and adapted to form a closure therefor, the opposite end of said valve being open, a sleeve secured at one end to said container and snugly surrounding said valve to support it for reciprocation toward and away from said opening, a conduit communicating with the interior of said sleeve at a point spaced from said opening and covered by said valve when the latter is acting as a closure for said opening, a collar carried by said valve within the open end thereof, an axial shaft threaded in said collar, and a bearing fixed with respect to said sleeve and rotatably supporting said shaft, said shaft being fixed against axial movement with respect to said bearing.

10. A device of the character described comprising a cylindrical sleeve adapted to be secured at one end against a container to surround an opening therein, a hollow cylindrical valve reciprocable in said sleeve and having a closed end adapted to be moved to a point adjacent the opening in the container to form a closure therefor, a conduit communicating with the interior of said sleeve at a point spaced from the opening in the container and covered by said valve when the latter is acting as a closure for said opening, and actuating means for said valve connected thereto within the opposite end thereof.

11. A device of the character described comprising a cylindrical sleeve adapted to be secured at one end against a container to surround an opening therein, a hollow cylindrical valve having one end open and its other end closed and adapted to be moved to a point adjacent the opening in the container to form a closure therefor, a conduit communicating with the interior of said sleeve at a point spaced from the opening in the container and covered by said valve when the latter is acting as a closure for said opening, and an operating shaft for said valve connected thereto within the open end thereof.

12. A device of the character described comprising a cylindrical sleeve adapted to be secured to a container to surround an opening therein, a hollow cylindrical valve having one end open and its opposite end closed and adapted to be moved to a point adjacent the opening in the container to form a closure therefor, packing arranged between said sleeve and said valve at a point remote from the opening in the container, a conduit communicating with the interior of said sleeve between the opening and said packing, and an operating shaft for said valve connected thereto within the open end thereof.

13. A device of the character described comprising a cylindrical sleeve adapted to be secured at one end against a container to surround an opening therein, a valve snugly fitting in said sleeve and corresponding in shape to the internal shape of said sleeve, said valve being movable to a point adjacent the opening in the container to form a closure therefor, a conduit communicating with the interior of said sleeve at a point spaced from the opening in the container and covered by said valve when the latter is arranged adjacent the opening in the container, and means for actuating said valve.

14. A device of the character described comprising a cylindrical sleeve adapted to be secured at one end against a container to surround an opening therein, a valve corresponding in shape and size to the interior of said sleeve and slidable therein, said valve being movable to closed position with a portion thereof arranged adjacent the opening in the container to form a closure therefor, a conduit communicating with the interior of said sleeve at a point spaced from the opening in the container and covered by said valve when the latter is arranged in closed position, and means for actuating said valve.

15. A device of the character described comprising a cylindrical sleeve adapted to be secured at one end against a container to surround an opening therein, a valve snugly fitting in said sleeve and movable to closed position with a portion thereof arranged adjacent the opening in the container to form a closure therefor, means for providing packing between said valve and said sleeve at a point remote from the opening in the container, said sleeve being provided with a discharge opening between the opening in the container and said packing means and covered by said valve when the latter is in closed position, and means for actuating said valve.

16. A device of the character described comprising a cylindrical sleeve adapted to be secured at one end against a container to surround an opening therein, a cylindrical valve slidable in said sleeve, said valve being movable to closed position with one end thereof arranged adjacent the opening in the container to form a closure therefor, said sleeve being provided with a discharge opening covered by said valve when the latter is in closed position, and means for actuating said valve.

17. A device constructed in accordance with claim 16 wherein said actuating means includes a rotatable shaft having threaded connection with said valve and secured against longitudinal movement, and means for preventing rotation of said valve.

18. The combination with a container having an opening therein, of a valve movable toward and away from said opening, said valve being adapted to form a closure for said opening and having a portion corresponding in shape to the wall of said container adjacent said opening to form a substantial continuation thereof when the valve is in closed position, and means snugly surrounding said valve and supporting it for movement toward and away from said opening, said means being provided with an outlet opening spaced from the container and closed by said valve when the latter is in closed position and adapted to communicate with the interior of said container when the valve is moved away from said opening.

19. The combination with a container having an opening therein, of a cylindrical valve having an end adapted to form a closure for said opening and provided with a portion corresponding in shape to and adapted to form a substantial continuation of the walls of the container adjacent said opening when said valve is in closed position, a sleeve secured to the container and snugly surrounding said valve to support it for movement toward and away from said opening, a conduit communicating with the interior of said sleeve at a point spaced from said opening and covered by said valve when the latter is acting as a closure for said opening, and means for actuating said valve.

In testimony whereof I affix my signature.

HAROLD ROBERT RAFTON.